Dec. 14, 1943.   A. VENDITTY ET AL   2,336,579
UNIVERSAL JOINT
Filed May 27, 1942   2 Sheets-Sheet 1
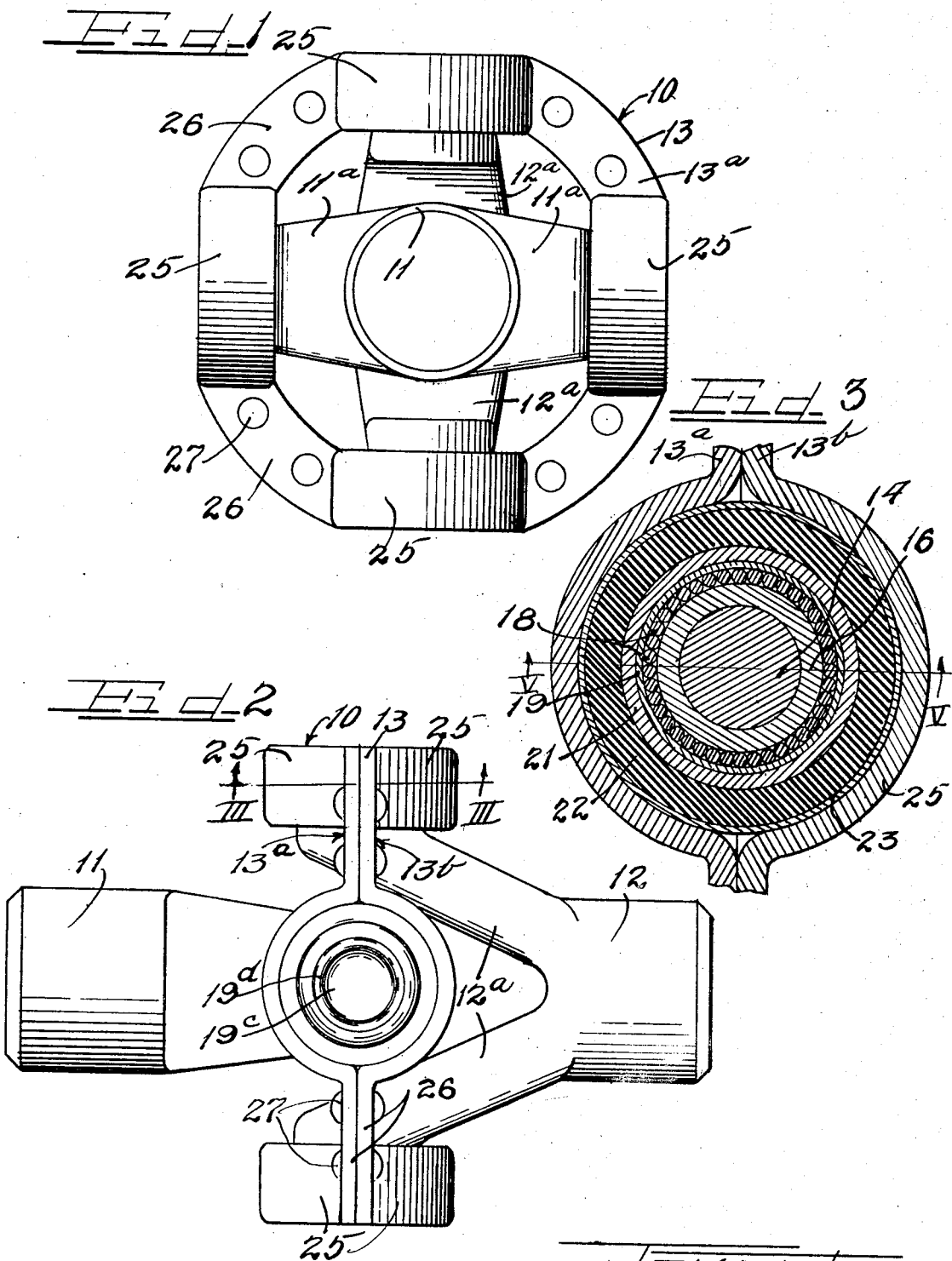
Inventors
Anthony Venditty
Matthew P. Graham
by Charles W. Hills Attys.

Dec. 14, 1943.  A. VENDITTY ET AL  2,336,579
UNIVERSAL JOINT
Filed May 27, 1942  2 Sheets-Sheet 2
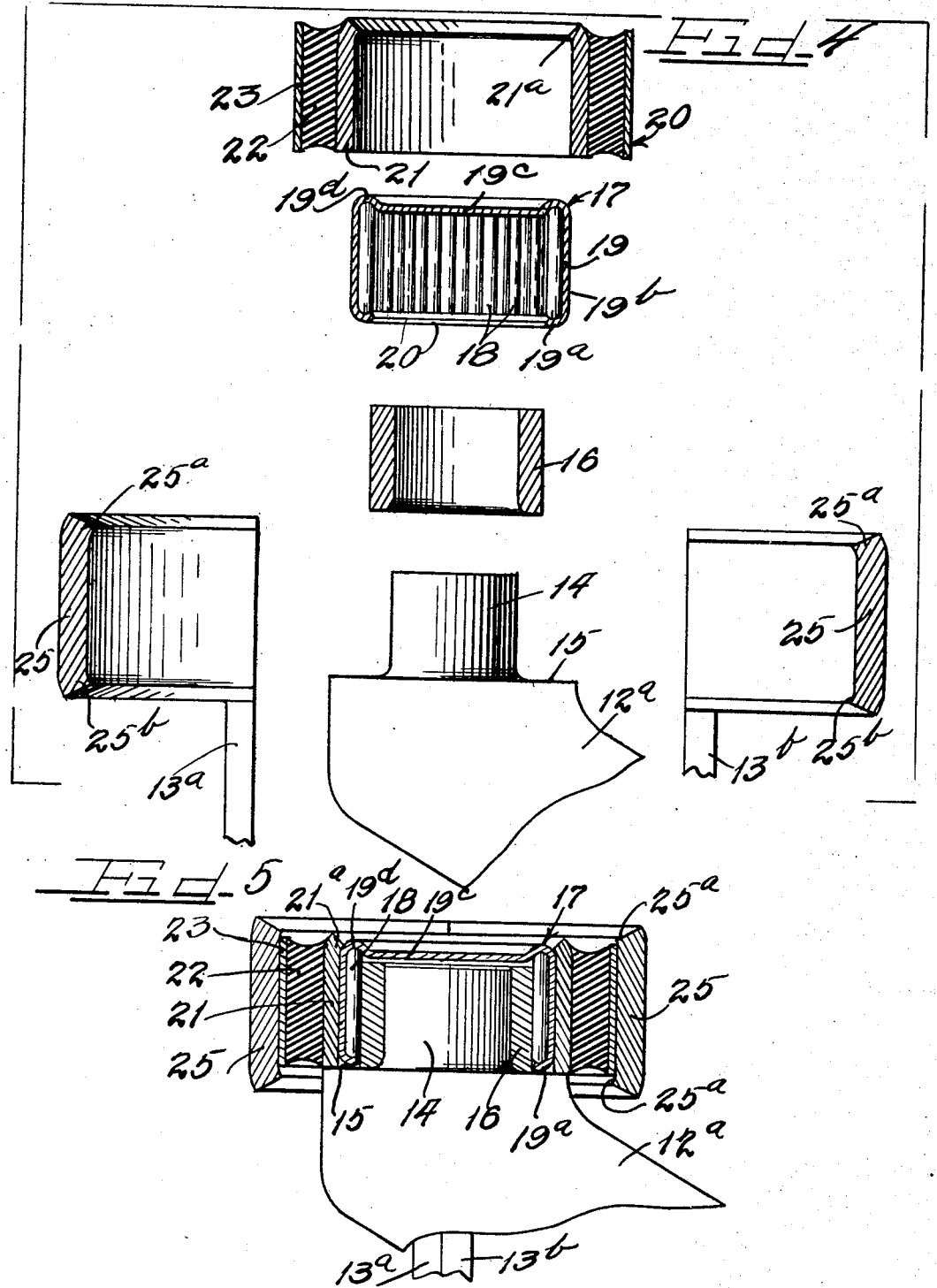
Inventors
Anthony Venditty
Matthew P. Graham
By Charles W. Hill Attys.

Patented Dec. 14, 1943

2,336,579

UNITED STATES PATENT OFFICE 2,336,579

UNIVERSAL JOINT

Anthony Venditty and Matthew P. Graham, Detroit, Mich., assignors to Thompson Products Incorporated, Cleveland, Ohio, a corporation of Ohio Application May 27, 1942, Serial No. 444,650

5 Claims. (Cl. 64—18)

This invention relates to universal joints and specifically relates to ring and yoke type universal joints having cushioned anti-friction bearings transmitting power between the yokes and ring.

According to this invention, driving and driven members of a power transmitting device such as a universal joint are joined in operative relation with a stamped two-piece ring which provides sockets for resilient cushions and needle type bearings.

A feature of the invention resides in the ease of assembly of the parts.

Another feature of the invention resides in the provision of an anti-friction bearing cage which not only holds needle bearings in operative relation, but also provides an end closure for sealing the bearing surfaces from loss of lubricant and ingress of dirt.

An important feature of the invention is the split connecting ring for the yoke members of the joint. This ring can be made from inexpensive complementary stampings which are readily united at the time of assembling the joint and, when united, operatively hold all parts in assembled relation.

An object of the invention is to provide a readily assembled universal joint structure.

A further object of the invention is to provide an inexpensive power transmitting device.

A still further object of the invention is to provide a rubber cushioned ring and yoke type universal joint.

Other and further objects of the invention will be apparent to those skilled in the art from the following detailed description of the annexed sheets of drawings which, by way of preferred example, illustrate one embodiment of the invention.

On the drawings:

Figure 1 is an end elevational view of a universal joint according to this invention.

Figure 2 is a side elevational view of the joint shown in Figure 1.

Figure 3 is an enlarged cross-sectional view along the line III—III of Figure 2.

Figure 4 is an exploded fragmentary view, with parts in vertical cross section, illustrating the manner in which the joints of this invention can be readily assembled.

Figure 5 is a cross-sectional view, with parts in elevation, taken along the line V—V of Figure 3.

As shown on the drawings:

In Figures 1 and 2, the reference numeral 10 designates a universal joint composed of yoke members 11 and 12 and a connecting ring 13. The yoke member 11 has a pair of diverging yoke arms 11a while the yoke member 12 has a pair of diverging yoke arms 12a. Each yoke arm 11a and 12a has an outturned journal portion 14 thereon as best shown in Figures 3 to 5. The journal portion 14 is bottomed by a flat annular shoulder 15.

A metal sleeve or bushing 16 is disposed around each journal portion 14 and can bottom on the flat shoulder 15.

A needle bearing assembly 17 composed of a ring of needle bearings 18 held in a casing 19 is seated around the sleeve 16. The casing 19 has an inturned flange 19a defining an opening 20 into the casing which is sufficiently large to receive sleeve 16. The inturned flange 19a will form an annular support for the inner ends of the needle bearings 18. The casing has a cylindrical side wall 19b and an end wall 19c with a beaded rim 19d providing an annular chamber for the outer ends of the needle bearings 18.

The casing 19 holds the needle bearings in operative relation and the entire assembly 17 can be readily slipped over the sleeve 16 so that the bearings will ride on the sleeve. The flange 19a of the casing can bottom on the shoulder 15 as shown in Figure 5 while the ends wall 19c of the casing will cover the end of the sleeve 16 and the end of the journal 14 thereby forming a closure for the bearing parts.

A cushion assembly 20, as best shown in Figure 4, is provided for surrounding each bearing assembly 17. The cushion assembly 20 is composed of an inner sleeve 21 with an inturned end 21a adapted to fit partially around the bead 19d of the bearing assembly. The sleeve 21 is adapted to be slipped over the casing 19 of the bearing assembly as shown in Figure 5 with the inturned flange 21a thereof partially overlapping the bead 19d to prevent endwise displacement of the bearing assembly 17. The sleeve 21 can be bottomed on the flat shoulder 15.

A rubber rings or bushing 22 is vulcanized to the outer wall of the sleeve 21 and this ring 22 is surrounded with a cylindrical ring 23 which is also vulcanized to the rubber. The cushion assembly 20 therefore comprises inner and outer rings 21 and 23 respectively vulcanized to an intermediate rubber ring 22.

The connecting ring 13 is composed of two stamped complementary metal rings 13a and 13b each having four semi-circular outwardly bowed portions 25 spaced equidistant therearound and separated by flat intermediate strip portions 26 apertured for receiving rivets 27.

As shown in Figure 2, the flat strip portions 26 of the rings 13a and 13b are placed in face to face engagement and the plates are riveted together by the rivets 27 to provide the connecting ring with four cylindrical sockets defined by the outwardly bowed portion 25 of each ring 13a and 13b. Thus two outwardly bowed portions 25 cooperate with each other to provide a cylindrical socket receiving the outer ring 23 of the cushion assembly 20.

As best shown in Figures 4 and 5 the ends of the portions 25 of each ring 13a and 13b are bent inwardly as at 25a and 25b for holding the cushion assembly against movement out of the socket.

The joints are readily assembled as indicated in Figure 4 by first slipping the sleeves such as 16 over each journal portion 14 of the trunnions, then slipping a bearing assembly 17 over each sleeve 16 and next slipping a cushion assembly 20 over each bearing assembly 17.

The two plates 13a and 13b are then brought together so that the socket-defining portions 25 thereof will receive the four cushion assemblies 20. The rings 13a and 13b are next riveted or otherwise secured together in assembled relation and the entire joint construction is thus held in operative assembly and is ready for use. The inwardly bowed portions 25a and 25b of the socket forming portions of the rings will prevent endwise displacement of the cushion assembly out of its socket, the inwardly bowed portion 21a on the inner ring of the cushion assembly will prevent axial displacement of the bearing assembly 17 out of its socket, and the end wall 19c of the bearing assembly 17 will prevent ingress of dirt and loss of lubricant to and from the needle bearings 18.

The yokes 11 and 12 can readily rotate in their respective bearing assemblies and driving torque is transmitted between the yokes by the connecting ring through the cushions provided in each socket of the connecting ring. The rubber or resilient portion of each cushion is exposed at the ends thereof to permit interparticle flow and deflection of the cushion material.

This invention eliminates heretofore necessary separate sealing rings and the like structure used in anti-friction type universal joints.

The connecting ring of the joints of this invention can be inexpensively made by stamping flat metal stock and the use of a two-piece ring greatly facilitates assembly of the joint parts.

It will, of course, be understood that various details of the invention may be varied through a wide range without departing from the principles of this invention and it is, therefore, not the purpose to limit the patent granted hereon otherwise than necessitated by the scope of the appended claims.

We claim as our invention:

1. A universal joint comprising a pair of yoke members each having outturned journaled portions, a bearing assembly surrounding each journal portion, a cushion assembly surrounding each bearing assembly, each cushion assembly having an inturned flange portion holding the bearing assembly against outward displacement, a connecting ring having open ended socket portions receiving each cushion assembly, and means retaining the cushion assemblies in their respective sockets of the connecting ring.

2. A universal joint comprising a pair of yoke members each having outturned journaled portions on the ends of the yoke arms thereof, an anti-friction bearing assembly surrounding each journal portion, each bearing assembly including an end wall covering the journal portion, a metal sleeve disposed around each bearing assembly having an inturned end holding the bearing assembly against outward displacement, a resilient cushion surrounding said sleeve, and a connecting ring for said yoke arms having open ended sockets with inturned end portions receiving each cushion to hold the cushion against displacement out of the socket, said connecting ring joining the respective journal portions in operative assembly through the respective cushions, rings and bearing assemblies.

3. In a universal joint, a member having an outturned journal portion bottomed by a shoulder, a sleeve disposed around said journal portion and seated on said shoulder, a plurality of needle bearings surrounding said sleeve in bearing engagement therewith, a cage for said needle bearings having flange portions disposed over the ends of the bearings and an end wall covering the journal portion, a cushion assembly surrounding said cage including a metal sleeve bottomed on said shoulder and having an inturned flange at the other end thereof disposed over said casing to hold the casing against endwise displacement, a rubber ring vulcanized to said metal sleeve, an outer sleeve enveloping said rubber ring and vulcanized thereto, a connecting member defining an open ended socket receiving said outer sleeve, and said socket having inturned end portions holding said outer sleeve against endwise displacement.

4. A universal joint comprising a pair of yoke members each having a pair of yoke arms with outturned journal portions bottomed by shoulders, an anti-friction bearing assembly disposed around each journal portion and including a cage covering the outer end of the journal portion, a cushion assembly surrounding each bearing assembly and including an inner sleeve bottomed on the shoulder and having an intuned outer end holding the bearing assembly against axial displacement, a connecting ring defining a socket for each cushion assembly and having inturned end portions holding each cushion assembly in its socket, said connecting ring being composed of secured-together stamped plates with complementary outwardly bowed portions defining said sockets and intermediate connecting portions, and means holding said intermediate connecting portions in face to face relation.

5. A universal joint comprising a pair of yoke members each having a pair of outturned journals bottomed by flat shoulders, a bearing assembly surrounding each journal and bottomed on said flat shoulders, a cushion assembly surrounding each bearing assembly and bottomed on said flat shoulders, each cushion assembly having an inturned end wall holding the bearing assembly against outward displacement, a pair of plates having outwardly bowed portions cooperating to define sockets receiving said cushion assemblies, and means securing said plates together.

ANTHONY VENDITTY.
MATTHEW P. GRAHAM.